US006035809A

United States Patent [19]
Fingerett et al.

[11] Patent Number: 6,035,809
[45] Date of Patent: Mar. 14, 2000

[54] LEASH POUCH FOR ANIMAL WASTE

[75] Inventors: Allison Marie Fingerett, Minneapolis, Minn.; Ricki Hope Gale, 5036 Oakland Ave. S., Minneapolis, Minn. 55417; Steven Asher Fingerett, Minneapolis, Minn.

[73] Assignee: Ricki Hope Gale, Minneapolis, Minn.

[21] Appl. No.: 08/769,325

[22] Filed: Dec. 19, 1996

[51] Int. Cl.[7] .............................. A01K 27/00; A45C 1/02
[52] U.S. Cl. ............................. 119/796; 150/117; 383/11; 383/38
[58] Field of Search .................................. 119/795, 796, 119/867; 150/114, 117, 107; 224/160, 162, 660; 16/110; 383/16, 6, 11, 13, 38

[56] References Cited

U.S. PATENT DOCUMENTS

| | | | |
|---|---|---|---|
| D. 393,504 | 4/1998 | Eisman | D30/162 |
| 3,937,418 | 2/1976 | Critelli | 119/796 X |
| 3,949,916 | 4/1976 | Yount | 224/26 R |
| 3,955,609 | 5/1976 | Siegel | 15/114 X |
| 3,955,728 | 5/1976 | Jackson et al. | 224/31 |
| 4,177,909 | 12/1979 | Haskell | 150/114 X |
| 4,211,091 | 7/1980 | Campbell | 383/6 X |
| 4,257,463 | 3/1981 | Monaco | 383/6 |
| 4,273,274 | 6/1981 | Freistadt | 383/6 X |
| 4,773,535 | 9/1988 | Cook | 383/11 |
| 4,886,150 | 12/1989 | Fitzsimmons | 190/1 |
| 4,961,522 | 10/1990 | Weber | 224/151 |
| 4,995,436 | 2/1991 | Cantor | 150/107 X |
| 5,007,470 | 4/1991 | Freeman | 150/114 |
| 5,174,658 | 12/1992 | Cook et al. | 383/33 |
| 5,197,525 | 3/1993 | Cantor | 150/107 X |
| 5,215,379 | 6/1993 | Pickard et al. | 383/6 X |
| 5,363,809 | 11/1994 | Roe | 119/792 |
| 5,377,626 | 1/1995 | Kilsby et al. | 119/796 |
| 5,439,154 | 8/1995 | Delligatti | 224/601 |
| 5,441,017 | 8/1995 | Lindsay | 119/795 |
| 5,540,469 | 7/1996 | Albert | 294/1.4 |
| 5,727,500 | 3/1998 | Conboy | 119/174 |

FOREIGN PATENT DOCUMENTS

| | | | |
|---|---|---|---|
| 68445 | 7/1994 | Switzerland | 119/795 |

OTHER PUBLICATIONS

"Bag Time™ Designer Bags", *Doctors Foster & Smith* Catalog, p. 122, 1995/1996.
"Dispoz–a–Scoop", *Doctors Foster & Smith* Catalog, p. 122, 1995/1996.
"Cruisin' Dog Pack," advertisement, Doctors Foster & Smith Catalog (Jan. 1998).
"The Jazz Pac," advertisement, Dog Fancy, p. 88 (Jul. 1998).
"Lead–Pack" product tag, purchased in Jun., 1998.
"stylie dog" product tag, purchased in Jul., 1998.
Zarbock, M., "Chase Away the Chills," Dog Fancy, p. 91 (Nov. 1997).
Zarbock, M., "Be Prepared for Summer Fun," Dog Fancy, p. 93 (Jun. 1998).
Duty Bag™, Sowards Enterprises, "Dog and Cat Book Catalog," Summer 1998 and copy of product label, (Date of Sale or Public Use Unknown.).

*Primary Examiner*—Michael J. Carone
*Assistant Examiner*—Yvonne R. Abbott
*Attorney, Agent, or Firm*—Merchant & Gould P.C.

[57] ABSTRACT

A leash pouch for containing disposable bags and animal waste when walking animals. The leash pouch attaches to a leash using a mounting device to free the pet owner's hands. A disposable bag compartment is on the first side of the pouch and a waste compartment is located on the second side of pouch. The pet owner picks up the waste with a disposable bag and places it in the waste compartment for later disposal. The leash pouch is convenient, lightweight, washable and durable.

10 Claims, 3 Drawing Sheets

LEASH POUCH FOR ANIMAL WASTE

BACKGROUND OF THE INVENTION

This invention relates to a pouch to be used by pet owners for collecting animal waste and holding accessories securely. Pet owners frequently take their animals for walks in public places for the purpose of exercise and bodily functions. The animal waste must then be collected for later disposal in order to comply with many local ordinances. Many pet owners simply use small plastic bags to pick up the waste. However, this approach forces the pet owner to juggle many items: the clean bags, the soiled bags and the leash, plus any other necessities, such as money or keys. Additionally, many pet owners find that carrying the plastic bags filled with animal waste by hand is unpleasant. The present invention solves these problems.

SUMMARY OF THE INVENTION

This leash pouch assists pet owners in collecting and carrying animal waste while walking their animal. The leash pouch has an easily accessible compartment for storing disposable plastic bags that are used to pick up the waste. The leash pouch also has a waste compartment for storing the filled plastic bags. A mounting device holds the leash pouch securely to the leash, so the pet owner only has to hold one item.

This invention provides a more pleasant and convenient way to collect animal waste using plastic bags and transport it to where it can be legally thrown away. Another advantage is that this invention provides a lightweight pouch that reduces the number of items a pet owner must carry when walking an animal because it attaches directly to the leash. The pouch is designed to carry animal waste and walking accessories, such as plastic bags and personal items. The invention also provides the advantage of being washable and durable.

DETAILED DESCRIPTION OF THE PREFERRED EMBODIMENT

Figure 1:
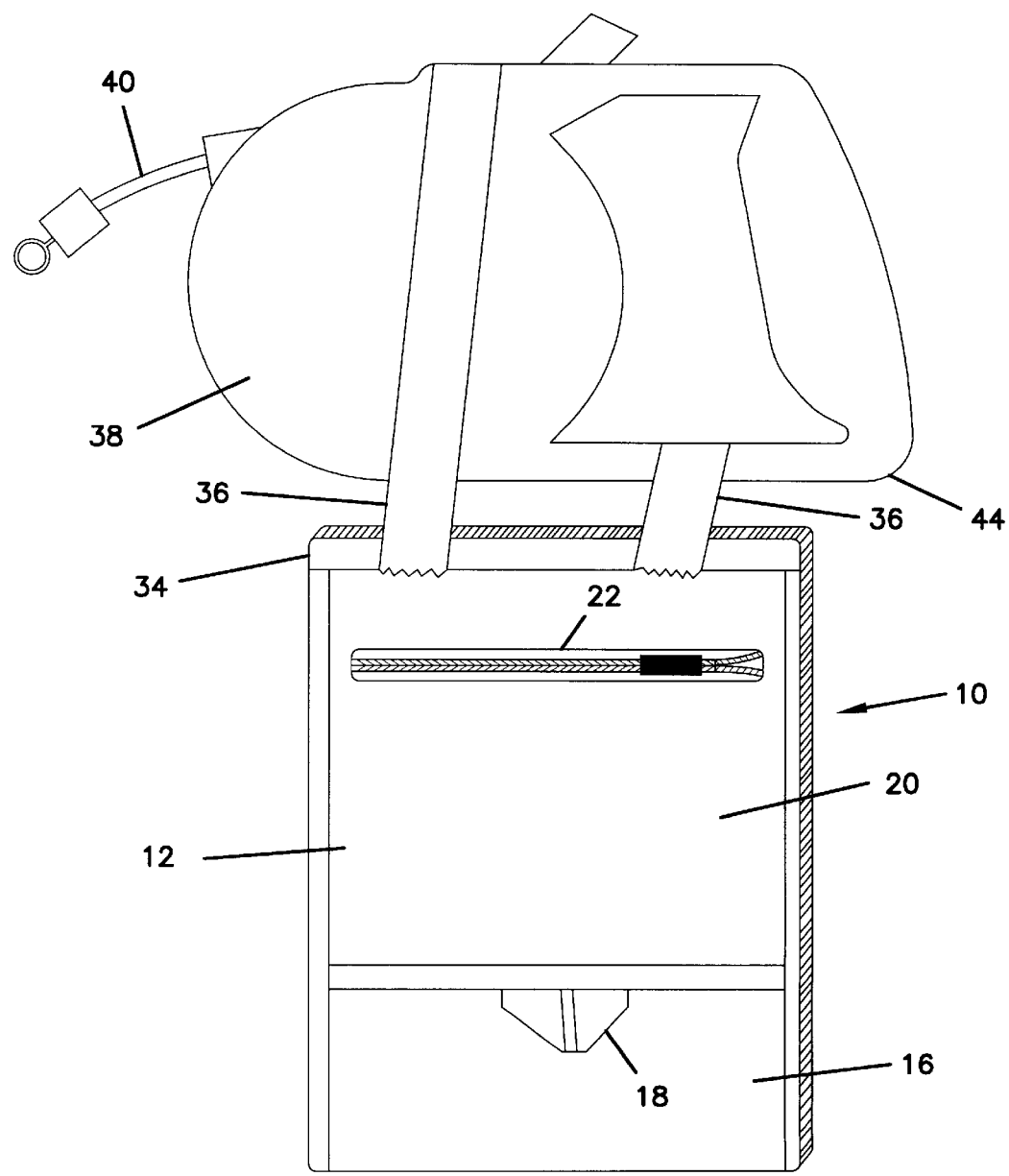
FIG. 1 is a view of a first side of a leash pouch of this invention attached to a retractable leash housing.

The invention is a leash pouch 10, as shown in FIG. 1, which can be used to collect and carry animal waste when walking a pet. The leash pouch 10 has a first side 12, shown in FIG. 1, that will preferably be held away from the pet owner's body when walking a pet. A second side 14, shown in FIG. 2, will be opposite the first side, preferably near the pet owner's body.

Referring now to FIG. 1, in the preferred embodiment, two compartments are located on the first side 12. A disposable bag compartment 16 is sized to receive clean small plastic bags, which can be used to pick up animal waste when walking pets. A plastic bag 18 is shown emerging from the disposable bag compartment 16. Pet owners can turn the plastic bag inside-out on their hand, pick up the waste, and turn the plastic bag right-side out to enclose the waste, without ever having to touch the animal waste directly. Therefore, small plastic bags are a sanitary and cheap way to pick up animal waste. The present invention allows pet owners to use plastic bags for animal waste collection and disposal more conveniently.

Also located on the first side 12 is a valuables compartment 20 for carrying the pet owner's keys, wallet, money, or other small items. The valuables compartment has a zippered access opening 22 to ensure that the items are safely contained.

Figure 2:
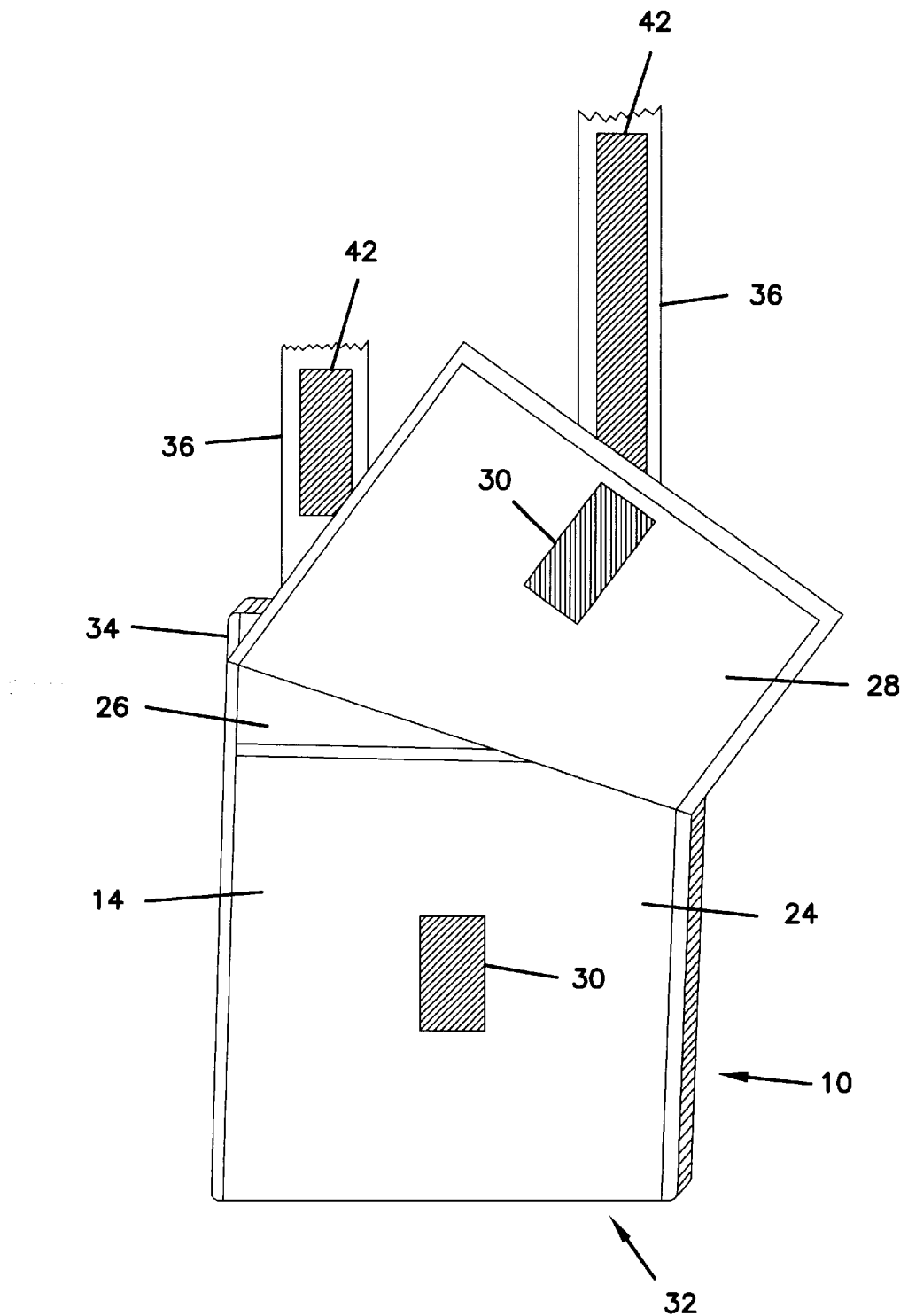
FIG. 2 is a view of a second side of a leash pouch of this invention.

Now referring to FIG. 2, the second side 14 of the leash pouch 10 has a waste compartment 24 where the filled plastic bags can be placed until they can be thrown away. The second side 14 may be held to face the pet owner's body, so that the pet owner can more easily put the waste in the waste compartment 24. The preferred methods of dog training all specify that the leash must be held in the pet owner's left hand. Using the configuration shown in FIG. 1, the waste compartment 24 will face the pet owner's body when the leash is held in the left hand.

The waste compartment 24 has an access opening 26, where the filled plastic bags are inserted, and a flap 28 which covers the access opening 26 and opens upward. The waste compartment 24 also has a closure 30, preferably of a hook and loop type, such as VELCRO® closure material, for securing the flap 28 to the leash pouch 10.

Figure 3:
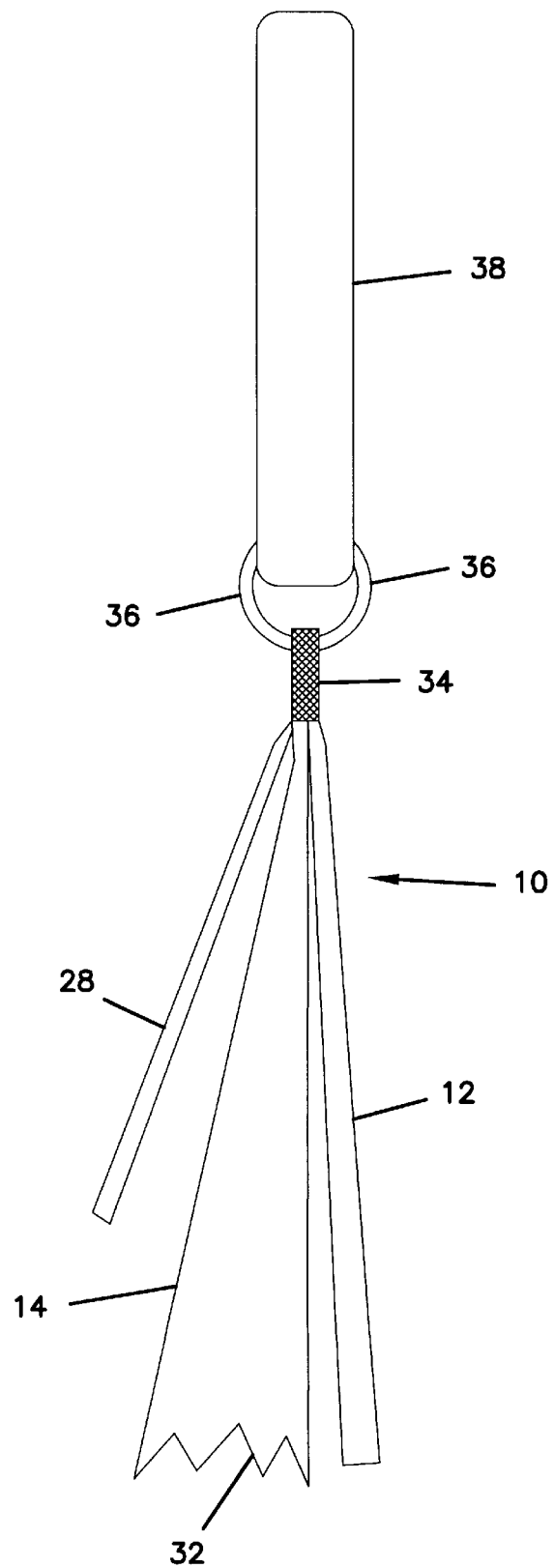
FIG. 3 is a profile view of the leash pouch of this invention.

A panel of the waste compartment 24 can have a gusset 32 to allow expansion of the interior space when filled plastic bags are placed inside. The profile view of FIG. 3 shows a gusset 32 in the bottom panel of the waste compartment 24.

Now referring to FIGS. 1 and 2, a mounting device is used to secure the leash 40 pouch 10 to a leash, so that the pet owner's hands are relatively free. In a preferred embodiment shown in the figures, two straps 36 are sewn onto a top portion 34 of the leash pouch 10. The straps have a hook and loop type fastener 42, such as VELCRO® closure material, on one side. Areas of closure material are adhered to a retractable leash housing. The straps 36 are used to wrap around the leash housing 38. Each strap 36 fastens to the closure material on the leash housing 38 and fastens back to the top portion 34 of the leash pouch 10.

The mounting device could take on many different forms other than the one described above. For example, where a rigid leash housing is used, one strap in conjunction with one strip of closure material is possible. Or, slits or hooks could be formed in the molding of the leash housing to receive straps or hooks that are attached to the leash pouch. Alternatively, a strip of fastener with a self-adhesive backing could be stuck to the bottom face 44 of the leash housing, while another strip of fastener is attached to the top portion of the pouch.

When a basic leash, i.e., an elongated strap of a material such as leather or fabric without a housing, is used, loops of fabric could be attached to the leash to receive straps or hooks which are on the leash pouch. Alternatively, a strip of fastener material could be included on a basic leash, supported by a stiff portion to ensure that the leash pouch retains its shape. Snaps, buckles or ties likewise could be used, either with a basic leash or a leash housing. A person skilled in the art will recognize that many other mounting alternatives are possible, and are contemplated by this invention.

The size of the waste compartment 24 may vary depending on the size of typical animal waste from the animal being walked, and the size of the leash housing, if any, used. For example, when walking a small to medium sized dog, up to 28 pounds, a rigid leash housing 38 with a base portion about 5.5 inches long is used. The preferred leash pouch in this context would have a top portion 34 about 6 inches across, and the leash pouch would extend downward from the top portion a distance of about seven inches.

Rigid leash housings for extendible leashes are commercially available in a variety of sizes. A typical example is the extendible leash product line available from Flexilead. The length of the base portions 44, shown in FIG. 1, of these leashes ranges from 2.5 inches to 5.5 inches, while the width at the middle portion of the leash housing ranges from 3.5 to 7 inches. The leash pouch of the present invention can likewise vary in length to be gracefully attached to the bottom of the leash housing, so that the leash pouch is about as long as, or slightly longer than, the base portion of the leash housing.

The preferred embodiment is constructed out of a nylon material, which is lightweight, washable, durable and flexible. Additional webbing is used to reinforce the top portion of the leash pouch and the flaps. This invention can be implemented in a variety of ways, such as by using other types of mounting devices or construction material.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for walking animals comprising a leash and a leash pouch mounted onto the leash, where the leash pouch comprises:
    a first side and a second side opposite to the first side;
    a top portion;
    a first compartment sized to receive disposable bags and located on the first side of the leash pouch;
    a waste compartment, sized for receiving animal waste in a disposable bag and located on the second side of the leash pouch, the waste compartment further comprising an access opening and a plurality of panels where the panels define an interior space; and
    a mounting device for attaching the leash pouch to the leash.

2. The apparatus for walking animals of claim 1, wherein the leash is retractable and comprises a rigid housing.

3. The apparatus for walking animals of claim 1, wherein the waste compartment further comprises:
    an upwardly opening flap which covers the access opening; and
    a closure for securing the flap to the second side of the leash pouch.

4. The apparatus for walking animals of claim 1, further comprising:
    a valuables compartment located on the first side of the leash pouch, the valuables compartment having an access opening and a closure for completely closing the access opening.

5. The apparatus for walking animals of claim 4, wherein the valuables compartment has a closure comprising a zipper.

6. The apparatus for walking animals of claim 1, where at least one panel of the waste compartment comprises a gusset to allow expansion of the interior space.

7. The apparatus for walking animals of claim 1, where the leash pouch is constructed from a flexible fabric material.

8. The apparatus for walking animals of claim 1, wherein the top portion is six inches across and the leash pouch extends seven inches away from the top portion.

9. The apparatus for walking animals of claim 1, wherein the mounting device comprises:
    a strap attached to the top portion of the leash pouch, having a hook and loop type fastener for securing the leash pouch to the leash.

10. The apparatus for walking animals of claim 1 wherein the mounting device comprises a strap attached to the top portion of the leash pouch, having a snap type fastener for securing the leash pouch to a leash.

* * * * *